United States Patent [19]

Meierling

[11] Patent Number: 4,909,303
[45] Date of Patent: Mar. 20, 1990

[54] STEEL MANUFACTURING SYSTEM, PARTICULARLY A MINI-STEEL PLANT

[75] Inventor: Peter Meierling, Lingeweide, Fed. Rep. of Germany

[73] Assignee: Fried Krupp GmbH, Essen, Fed. Rep. of Germany

[21] Appl. No.: 262,844

[22] Filed: Oct. 26, 1988

[30] Foreign Application Priority Data

Oct. 26, 1987 [DE] Fed. Rep. of Germany ....... 3736117

[51] Int. Cl.⁴ .................. B22D 11/00; B22D 47/00
[52] U.S. Cl. ................................ 164/418; 164/412; 164/417; 164/437
[58] Field of Search ............ 164/417, 418, 437, 438, 164/488, 477, 505, 506, 507, 508, 509, 469, 470, 335

[56] References Cited

FOREIGN PATENT DOCUMENTS

3116925 11/1982 Fed. Rep. of Germany.
3316367 11/1984 Fed. Rep. of Germany.

Primary Examiner—Richard K. Seidel

[57] ABSTRACT

A steel manufacturing system such as a mini-steel plant includes a series of treatment stations, one of which is a furnace which preferably receives scrap as the starting material. In order to significantly reduce the volume of the buildings needed for the steel manufacturing system, and thus the investment costs, the treatment stations are arranged in a furnace hall whose cross section is substantially adapted to the components of the treatment stations. With respect to the flow of material and the centers of the stations, each treatment stations is disposed along a straight line with an adjacent station. The steel manufacturing system also includes a continuous caster which is disposed in a casting hall and which receives molten steel from the furnace hall.

19 Claims, 6 Drawing Sheets

STEEL MANUFACTURING SYSTEM, PARTICULARLY A MINI-STEEL PLANT

BACKGROUND OF THE INVENTION

The present invention relates to a steel manufacturing system, particularly a min-steel plant, of the type in which steel is melted from iron carriers, preferably scrap or a similar starting material, and is continuously cast in a casting hall, with individual intermediate treatment stations being arranged in series and in a line with respect to the flow of material and the center of the station.

To save investment and production costs, the iron and steel industry has long attempted to reduce the investment required for their systems. The investment can be reduced, in particular, by shortening transportation paths. This applies for large systems, such as the so-called mini-steel plants which serve, in particular, for the production of steel from scrap. Generally, the scrap is melted into steel in an electric furnace, with or without preheating, and is cast continuously in an associated continuous caster. Although most of the prior art mini-steel plants have been erected as new structures, because they follow the known "classical" smelting plants too closely they are still too large and too expensive in design.

DE-OS (German published unexamined application) 3,316,367 discloses a method and apparatus for producing steel by means of oxygen bubbles. In this reference the melt is treated in a straight line from the furnace to the caster in metallurgical vessels which are moved on cars, with the straight line being in a hall. Alternatively, the use of 100% scrap is also contemplated without a separate melting furnace being employed. However, scrap cannot be melted economically in movable, oxygen heated ladles. The known problems of melting scrap without the addition of pig iron is thus not considered. Moreover, nothing is disclosed about the necessary process steps and system components, such as ladle return and preparation (lining), feeding in the required materials, and supply devices, to name but a few. The implementation of the proposed process for a specific system is thus questionable.

SUMMARY OF THE INVENTION

It is an object of the present invention to improve a system for the production of steel of the above-mentioned type so that, by further reducing the size of the system, construction and production will become more economical.

This object can be attained by providing a steel producing system in which the furnace and all other treatment stations are arranged in a furnace hall whose cross section is essentially adapted to the units in the treatment stations, with each treatment station being connected in line with the respectively adjacent treatment stations and with at least one transporting device being employed. Furthermore a casting hall follows the furnace hall and is provided with a preparation hall section adjacent the furnace hall.

The invention and its features result in numerous advantages, with the most significant advantages being discussed below.

The adaptation of the furnace hall cross section to the treatment stations, such as a melting furnace, a scrap preheating system, ladle heating and preheating stations, and a degasification stations, to name but the most important ones, results in the least possible amount of structural volume. The costs for hall ventilation are also significantly reduced, and the construction of the furnace hall as a closed hall prevents dust originating in adjacent halls from entering. In this way, the operating and maintenance personnel in the furnace hall are subjected to less dust pollution, and furthermore the wear on mechanical devices due to dust is reduced.

The adaptation of the furnace hall cross section to the assemblies primarily signifies that the lateral hall walls have the least possible distance from the assemblies. The same applies also for the height of the halls, in connection with which primary consideration must be given the material transporting devices which are employed.

Due to the linear connection of adjacent treatment stations, such stations are unequivocally associated with one another while providing the shortest transportation paths for the material. The transporting devices, regardless of which type of the various known transporting devices are employed, are preferably arranged in the vertical plane of the straight-line connection of the treatment stations. If the material is transported in ladles or tubs, dual-track or single track traveling trolleys can be employed instead of complicated bridge cranes for transporting the material. If the treatment stations are all arranged in a straight line, as is preferably provided, a single trolley is possibly sufficient to transport the material. Advantageously, the furnace hall can at least substantially retain the width of its cross section over its entire length. The material may also be transported in ladle trolleys on rails or, depending on the consistency of the material, on conveyor belts or in conveyor troughs.

In the novel system, the empty ladles can be removed from the casting hall on the shortest path and can be recirculated to the melting furnace. This can be done within or next to the furnace hall. The return is advisably effected by way of the preparation hall if, as provided by a preferred feature, a casting hall follows the preparation hall (when seen in the direction of material flow) downstream of the melting furnace in the furnace hall, with part of the preparation hall being adjacent the furnace hall. This also makes it possible to perform ladle blow-out and burn-out operations away from the furnace hall, and the respective station can easily be encapsulated separately if required in order to remove dust. The casting hall may extend parallel or at a right angle to the furnace hall. The casting hall, which is made as low as possible and is possibly stepped in height, is followed by respective halls for the particular type of further processing of the material that is desired.

The system according to the invention further makes it possible to arrange servicing stations for the assemblies disposed in the furnace hall immediately adjacent the furnace hall and adjacent or opposite the casting hall. This refers to servicing stations such as control platforms, a laboratory, and equipment for supplying current, water, and hydraulic oil. Such an arrangement makes these quickly and easily accessible and protects them against the influence of dust or heat.

In a case where larger components must be transported from an operator station into the furnace hall, such as, for example, the electrodes for a change of electrodes, a trolley which is movable perpendicularly to the furnace hall or a smaller bridge crane is connected with the associated assembly. The passage through the furnace wall can be made by way of a tightly fitting door.

It is further of particular advantage for the furnace hall to be constructed, in the region of the melting furnace, which is preferably an electric furnace equipped with a bottom tap, so that it includes a housing equipped with a gas flue. The gas flue may be followed directly by a dust removal system. Particularly if the current is not sufficient or is not ensured at a certain location, it is of advantage for the melting furnace and/or other heating and treatment stations to be heatable alternatively by different heating means. This provides greater flexibility with respect to the supply of energy. In addition to electrical heat of various types, heating by lances, burners and, in particular, plasma burners, can here by considered.

For the preferred case of use where scrap or suitable sponge iron supplied cold is employed as the starting material, it is of particular advantage for the vessel of the melting furnace to be movable underneath a stationary preheating station. The preheating station may then be heated by the exhaust gases from the melting furnace which are supplied to the preheating station through permanently installed conduits.

However, the production of steel in the novel system is not limited to the use of scrap or sponge iron but may also employ other iron carriers, e.g. iron ores. In that case, reduction devices, such as the known solid matter or gas direct reduction devices or also melt reduction devices, can be used which are then connected to precede the melting furnace. A shaft furnace or rotary furnace may here directly precede the melting furnace so that the hot sponge iron is charged into the melting furnace without intermediate cooling. In the melt reduction processes with which pig iron is produced, an oxygen blow converter is preferably employed for the further treatment of the liquid pig iron. The individual treatment assemblies for reduction or melt reduction may be connected if necessary, in the same manner as the other treatment stations, one behind the other in a straight line in the furnace hall. It is also conceivable to make changes, in adaptation to the raw material situation, in the treatment preceding the melting furnace so that the existing treatment assemblies can be circumvented or exchanged. The latter also applies for the treatment chain downstream of the melting furnace in the case of the selective production of low-grade, high-grade, or other special steel. In this case, at least one suitable treatment station, such as a gas agitated blower converter or degasification device, can be included between the melting furnace and the reserve station of the continuous casting system. For the case where it is intended to produce such steels exclusively, the respective treatment stations are of course permanently installed.

In spite of the flexibility with respect to adaptation to various raw materials and steels to be produced, the novel system permits the greatest possible standardization of structures and apparatus, e.g. in the manner of a modular system. It is also possible, in order to increase production, to easily exchange treatment assemblies and other mechanical and electrical devices for larger ones. With reference to a modular system, this means that more than one size of the treatment assemblies fits into a hall of one size, with flexibility being increased in that overlaps in size stages are possible, i.e., the same treatment assemblies can be used in at least two hall sizes. This measure is favorably influenced, in particular, by the fact that furnace diameters change only very slightly even if a great change is made in melting output. For example, a steel production of about 150,000 tons per annum requires an electric furnace of a diameter of about 4 m, but for a production of about 750,000 tons per annum a furnace having a diameter of 7.3 m would be sufficient. Due to the central arrangement of the transporting devices in the furnace hall, it is also possible to broaden the hall to a limited degree by moving the furnace walls. In the novel system, the construction costs for the furnace hall are reduced up to about 60% compared to prior art furnace halls.

Another advantage of the system according to the invention is that the transporting devices employed, particularly the cranes, are utilized much more uniformly than in prior art systems. Thus, in the preparation hall according to the invention, the cranes are utilized to up to about 60% capacity compared to about 30% capacity in prior art preparation halls. The other transporting devices, such as the trolleys which are preferably employed, also are utilized up to about 60% without interfering with proper material flow. By arranging all transporting devices of the system in an unequivocally locally and functionally limited association with the individual process stages, the resulting material flow is practically without delays since a need for one transporting device to perform several tasks simultaneously is avoided. The transport of alloying substances, additives or the like can be effected in a known manner from bunkers by way of conveyors while auxiliary substances and other material, such as refractory material or slag, are transported primarily by industrial vehicles.

DESCRIPTION OF THE PREFERRED EMBODIMENTS

Figure 1:
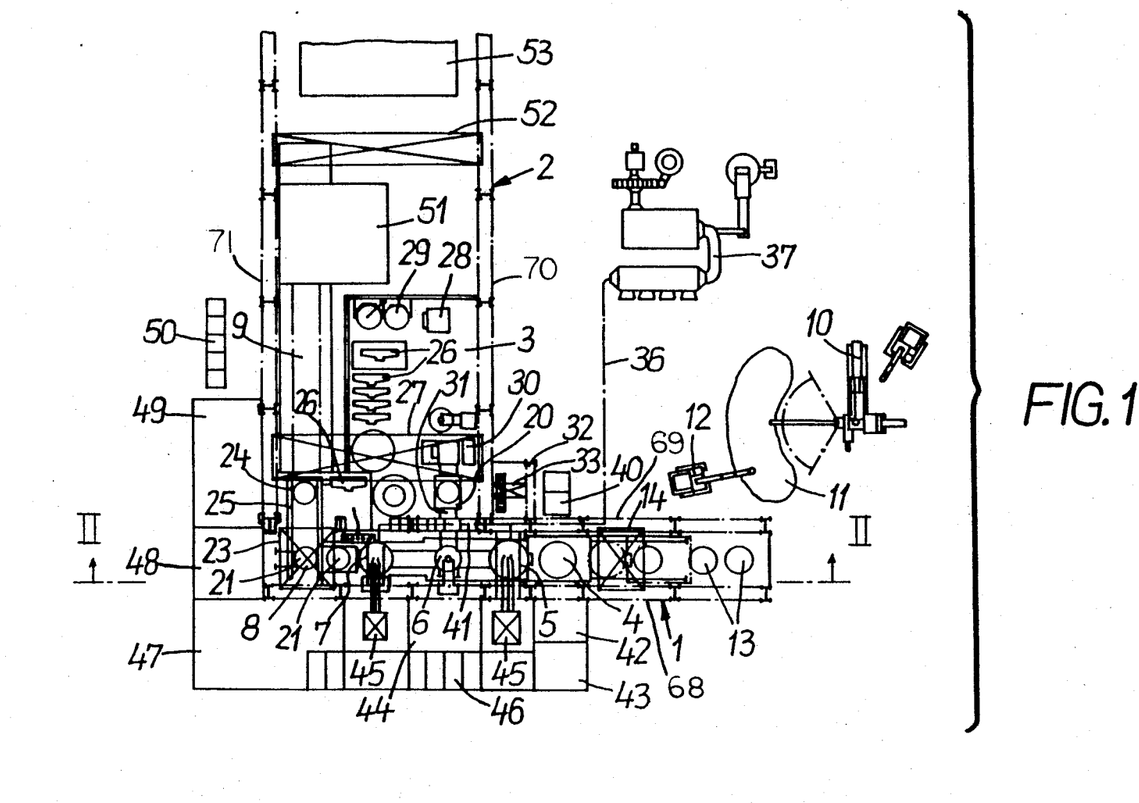
FIG. 1 is a plan view schematically illustrating a first embodiment of a system for producing solid steel in accordance with the present invention.
Figures 2, 3, 4:
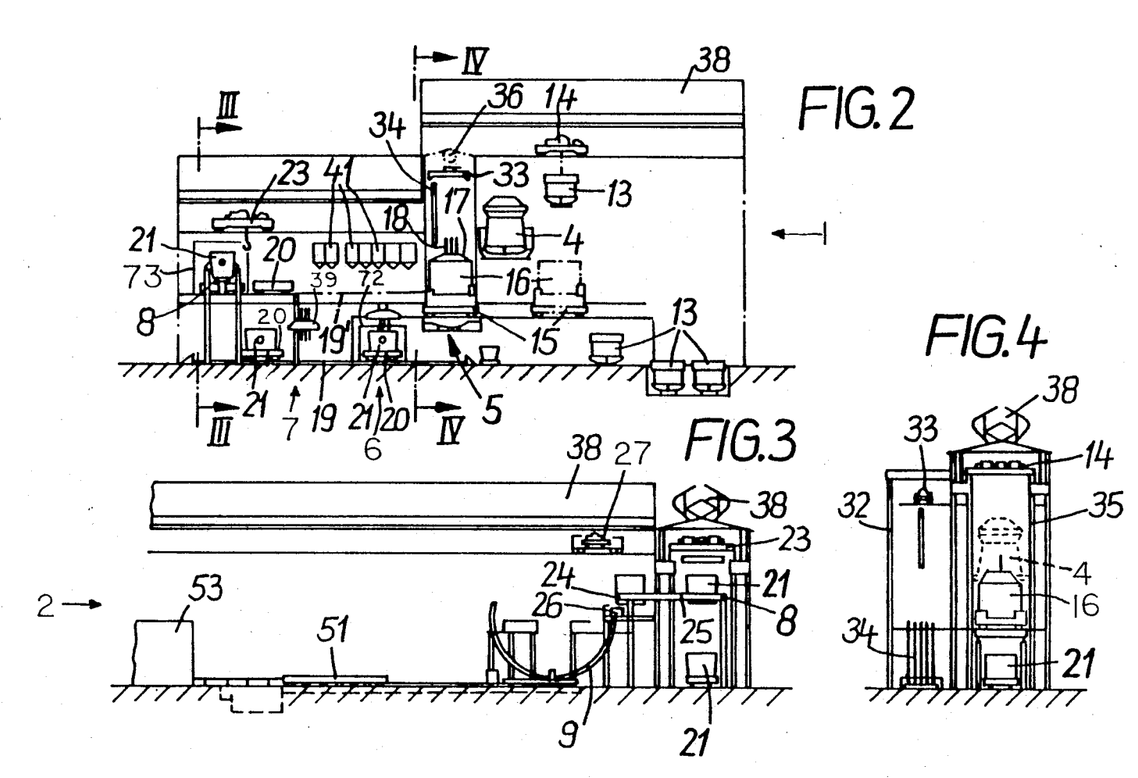
FIG. 2 is a sectional view taken along line II—II of FIG. 1, illustrates the furnace hall in the embodiment of FIG. 1.
FIG. 3 is a sectional view along line III—III of FIG. 2, and illustrates the casting hall extending from the terminal portion of the furnace hall.
FIG. 4 is a sectional view along line IV—IV of FIG. 2.

FIG. 1 schematically illustrates a top plan view of an embodiment of a mini-steel plant in accordance with the present invention. As can be seen in FIG. 1, an elongate furnace hall 1 having side walls 68 and 69 is followed by a casting hall 2, which extends at a right angle from the side of furnace hall 1. Casting hall 2 has side walls 70 and 71. Casting hall 2 includes a preparation hall section 3 whose end is also adjacent furnace hall 1. Furnace hall 1 includes, in series, a high temperature scrap preheating station 4, an electric furnace 5 which serves as a melting furnace, a burner-heated ladle preheating station 6, an electric arc heated ladle heating station 7, and a ladle reserve station 8. From ladle reserve station 8, molten metal is supplied to a continuous caster 9 disposed in casting hall 2. Furnace hall 1 has the same width over its entire length but is staggered in height between electric furnace 5 and ladle preheating station 6 as shown in FIG. 2. This staggering additionally coincides with the side wall 70 of casting hall 2 which at this point is adjacent the furnace hall 1 and which, as shown in FIGS. 2 and 3, has the same height as the part of the furnace hall 1 adjacent to it.

The production sequence and material flow in the system will now be described with initial reference to FIGS. 1 and 2. Scrap, possible pulverized in a comminution system 10 and compacted, is taken from a reservoir 11 by means of a gripper crane 12 and filled into scrap baskets 13. Scrap baskets 13 are disposed at the entrance end of furnace hall 1 and are accessible to the gripper crane 12. A charging trolley 14 transports the filled scrap basket 13 to preheating station 4, where the basket 13 is emptied by opening its bottom flaps (not shown). The scrap is highly preheated and then emptied—again through the bottom—into an electric furnace vessel 16 which has been moved underneath preheating station 4 by a car 15 moving on rails. Before the vessel 16 is moved, the cover 17 of the electric furnace is raised and electrodes 18 are removed from the vessel 16. After vessel 16 has been filled, it returns to the treatment station of electric furnace 5, where the scrap is melted in a known manner.

With continuing reference to FIGS. 1 and 2, the molten steel is emptied from electric furnace 5 through a bottom discharge into a ladle 21 moved underneath the furnace 5 by means of a car 20 on tracks 19. Before this occurs, the lining (not illustrated) of the ladle 21 is preheated to the required temperature in ladle preheating station 6. Then car 20 with the filled ladle 21 is transported on tracks 19 to ladle heating station 7 (also called a ladle furnace), where it is heated to the required temperature by an electric arc heating system 39. At the end of the heating process, the electrodes of the electric arc heating system 39 are removed from the ladle 21. Then the ladle 21 is transported further on car 20, is lifted by a casting trolley 23 disposed in the terminal portion of the furnace hall 1, and is placed into reserve station 8.

Referring next to FIGS. 1 and 3, the ladle 21 is moved on rails 25 from the reserve station 8 to the casting position 24 of continuous caster 9 as soon as the preceding ladle has been removed from casting station 24. Then the ladle 21 is emptied in a known manner into a distributor vessel 26 disposed below the ladle 21.

Casting hall 2 is bridged over its entire width by a bridge crane 27 which transports the empty ladle 21 from the casting position 24 into the preparation hall 3. There, depending on its condition, it is moved either to a breakout station 28 where damaged portions of the refractory lining are removed and thereafter to a re-lining station 29 or, in preparation for the next ladle fill, to a so-called horizontal ladle fire 20 for blowing free the porous plug (not illustrated) and servicing of the ladle slide gate (not illustrated). From here, the ladle 21 is placed onto a car 20 available on a track 31 extending from preparation hall section 3 to ladle preheating station 6 in furnace hall 1. The tracks 19 and 31 intersect at ladle preheating station 6, where a turntable (not illustrated in FIG. 1 to avoid further complicating the drawing, but see turntable 74 in FIGS. 5 and 6) is provided for the cars 20. The preheated ladle is again moved from ladle preheating station 6 underneath electric furnace 5 in order to receive the next charge.

Several possible variations in the system as described thus far will now be briefly described.

A second rail may be provided to return the ladles 21. For example, a raised track as indicated by dot-dash line 19' in FIG. 2 may extend into the region of furnace 5 and be connected at both ends with track 19 by lifting devices (not shown). Such lifting devices would be equipped with direction changing switches for ladles 21 and their cars 20. Casting trolley 23 could then be omitted.

Instead of locating preparation hall 3 at the position shown in FIG. 1, the ladles 21 may be transported for relining and repair to a preparation hall section (not shown) which is positioned adjacent the rear wall of furnace hall 1, past reserve station 8. The track 19 would be elongated to extend into such an alternative preparation hall section in a straight line.

Preheating station 4 can be omitted, in which case car 15 would move vessel 16 between furnace 5 and the position shown in dot-dash lines in FIGS. 1 and 2, at which position the vessel 16 is filled with scrap from a bucket 16 carried by charging trolley 14.

Wall 69 of furnace hall 1 preferably extends to wall 71, and is provided with lockable gates 72 and 73 (see FIG. 2) for passage of ladles 21. However, wall 69 may extend only far enough past wall 70 to shield furnace hall 1 from preparation hall section 3, since little or no dust comes from the remainder of casting hall 1. In exceptional cases, for example if preparation hall section 3 has a dust removal system which is designed and configured in such a way that no significant dust development occurs in the region adjacent furnace hall 1, wall 69 might extend only as far as wall 70.

Turning next to FIGS. 1 and 4, a servicing station 32 is located at the corner formed between furnace hall 1 and casting hall 2. From servicing station 32, the replacement electrodes 34 for electric furnace 5 are exchanged by means of a bridge crane 33. Electric furnace 5 is enclosed by a special housing 35 which, as indicated by dot-dash line 36, is connected to a suction and dust removal system 37. As is shown in FIGS. 2-4, the roofs of the furnace and casting halls are each provided with a continuous ventilation device 38. Casting trolley 23, which is a double-rail trolley, is additionally equipped with an auxiliary trolley (not illustrated in FIGS. 1-4, but see auxiliary trolleys 77 in FIG. 7) which is movable transversely to furnace hall 1 and has a relatively small carrying capacity. This auxiliary trolley is intended primarily for the exchange of the electrodes of electrode assembly 39 for ladle heating station 7.

Adjacent furnace hall 1, bunkers 40 (FIG. 1) and 41 (FIG. 2) for alloying means and additives are provided, each higher than the associated treatment station. These bunkers are charged, if required, by way of conveyor belts and chutes (not shown).

As is shown in FIG. 1 various servicing stations and maintenance shops are disposed adjacent furnace hall 1, opposite casting hall 2. These stations and shops include a control platform 42, a laboratory 43, a repair shop 44, transformers 45 for the supply of the electric arcs, current supply 46, and voltage flicker compensation 47. These are followed by a hydraulic oil supply station 48 and—adjacent casting hall 2—a water supply 49 and cooling towers 50. In casting hall 2, the cut-off billets (not shown) are transported by a bridge crane 52 from a cooling bed 51 into a reheating furnace 53, from whence they are moved into a rolling mill (not shown).

If the bottom and upper portion of vessel 16, cover 17, and the cover core piece (not shown) of electric furnace 5 are to be exchanged, the following components are employed (seen from preparation hall 3): bridge crane 30, one of the ladle cars 20, track 31, casting trolley 23, and car 15 (FIG. 2), which for this purpose moves into the region of the ladle preheating station 6. However, it is also possible to transport the components by means of an industrial vehicle (not shown) which moves outside of the halls between preparation hall section 3 and furnace hall 1, in which case car 15 is moved underneath a charging trolley 14 employed in this case. This is applicable, in particular, for more infrequent transports of heavy components, e.g. the bottom of vessel 16.

As was noted previously in the "Summary of the Invention" section, in the present invention the furnace hall cross section is adapted to the treatment stations therein in order to provide a relatively small structural volume. The cross section of furnace hall 1 in the embodiment of FIGS. 1-4 is adapted to the treatment stations therein in that the height and width of hall 1 are dimensioned to accommodate furnace 5, the largest treatment station in this embodiment, and to provide additional room that may be needed for safety and for the convenience of workmen. The distance between walls 68 and 69 is preferably about double the diameter of furnace vessel 16, although the distance between the walls may differ from double the furnace vessel diameter by about plus or minus 10% (i.e., from about 1.8 to about 2.2 times the furnace vessel diameter). The height of the portion of hall 1 above furnace 5 is preferably about 3.5 to 4 or even 5 times the diameter of furnace vessel 16 (from the floor of hall 1 to charging trolley 14). Thus, for a furnace vessel diameter of about 6 meters, the hall height may be up to about 30 meters.

Figure 5:
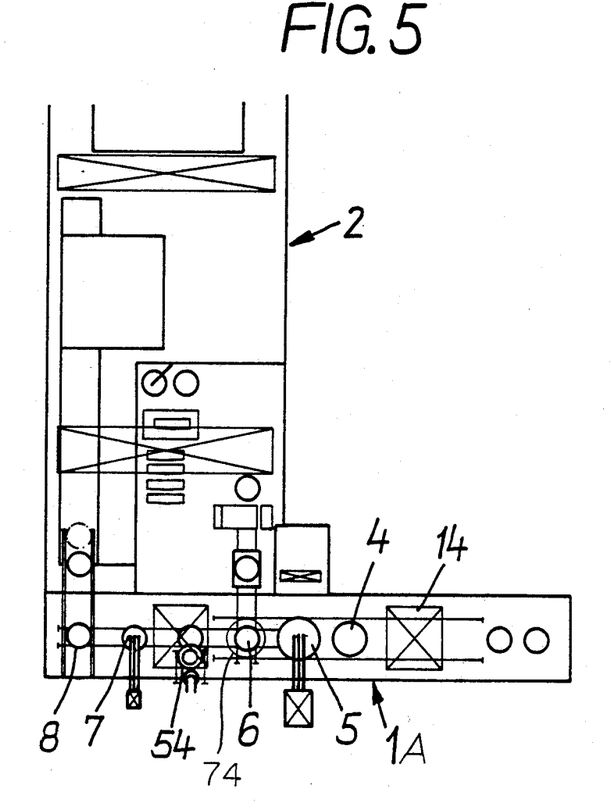
FIG. 5 is a plan view of another embodiment of a system in accordance with the present invention, this embodiment being employed for the production of stainless steel.

In the embodiment according to FIG. 5, which has the same basic structure as the preceding embodiment, a converter 54 is included within furnace hall 1A and is positioned between ladle preheating station 6 and ladle heating station 7. Converter 54 is fed with agitation gas, and may be an argon-oxygen converter. Converter 54 is not disposed at the center of the hall 1A but is inclined toward the center of the hall for loading and discharging. This system serves to produce stainless steel.

Figure 6:
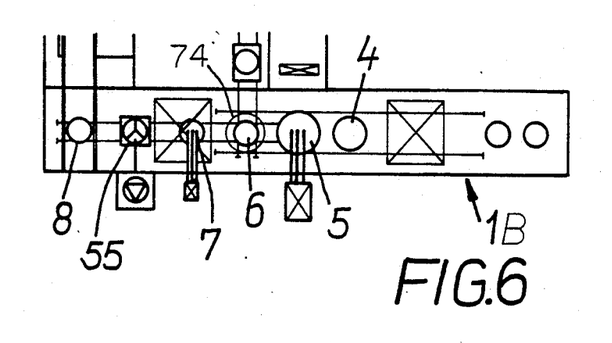
FIG. 6 is a plan view of the furnace hall of a further embodiment of a system in accordance with the present invention, this embodiment being employed for the production of specialty steel.

The system according to FIG. 6 also has the same basic structure as the preceding embodiments. Here a vacuum degasification device 55 is included in furnace hall 1B following ladle heating station 7. The ladle 21 to be treated can be moved underneath this station on tracks 19 (see FIG. 2).

Figure 7:
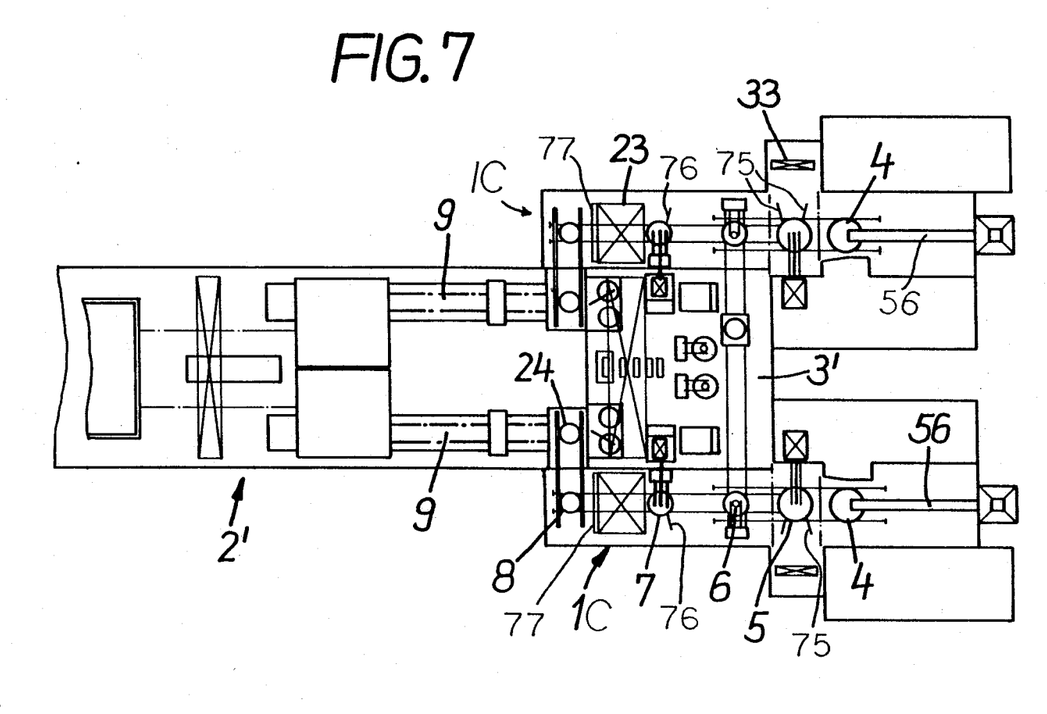
FIG. 7 is a plan view of yet another embodiment of a system in accordance with the present invention, this embodiment including two furnace halls arranged parallel to one another in a mirror image and a casting hall disposed therebetween.

The two furnace halls 1C of the embodiment according to FIG. 7 have the same structure as the embodiment according to FIG. 1 except at their entrance portions. In contrast to FIG. 1, the two preheating stations 4 in FIG. 7 are charged with scrap by ascending conveyors, particularly plate conveyors 56. Each conveyor 56 extends through the center of the respective hall 1C. The preparation hall section 3' of this system extends between the two furnace halls 1C, at the end of a casting hall 2' which is equipped with two caster 9, over the entire casting hall width. In spite of these modifications, the same sequence as in the embodiment of FIG. 1 is employed for the flow of material and the transport of the ladles. Because of the use of plate conveyors 56, charging trolley 14 (see FIG. 2) is omitted from the furnace halls 1C.

While furnace 5 and ladle heating station 7 preferably employ electrical heating means, a different heat source may also be used. For this purpose, FIG. 7 illustrates burner lances 75 which are introduced laterally into furnace 5 and burner lances 76 which are introduced into ladle 21 (not numbered in FIG. 7) at ladle heating station 7. Such additional heating means may, of course, also be used in the previously described embodiments.

Figure 8:
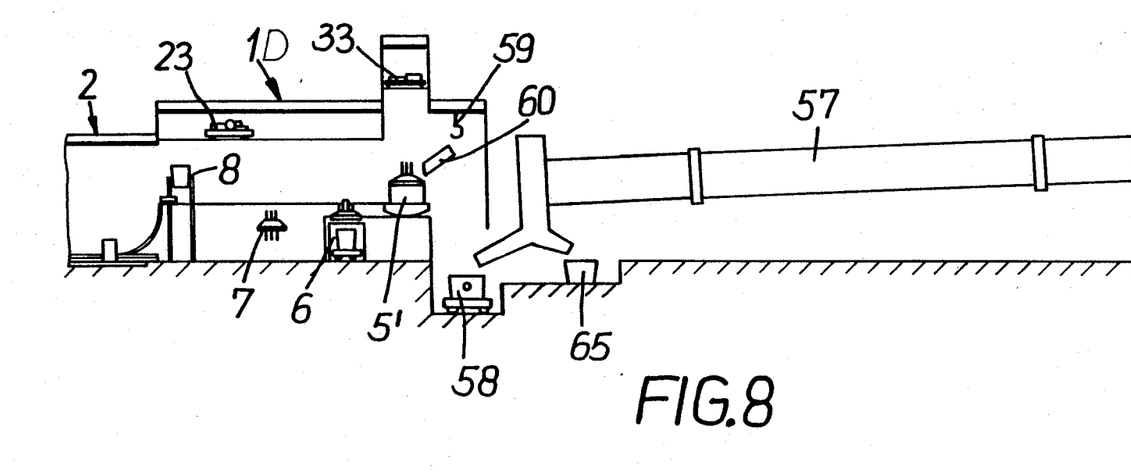
FIG. 8 is a vertical longitudinal central sectional view of yet a further embodiment of a system in accordance with the present invention, this embodiment including a combination of a rotary furnace and an electric furnace.

In the embodiment according to FIG. 8, a rotary furnace 57 directly precedes electric furnace 5' so that hot sponge iron can be charged and melted. Thus, electric furnace 5' need not be arranged to be movable. The sponge iron, freed from slag and excess carbon by hot sifting and possibly by magnetic separation, is discharged from the rotary furnace into a tub 58. Tub 58 is raised by a stationary crane 59 and in furnace hall 1D is emptied into electric furnace 5' by way of an adjustable chute 60. The slag is discharged into a tub 65. The part of the system following thereafter again corresponds, with respect to the flow of material, to the systems of the preceding embodiments.

Figure 9:
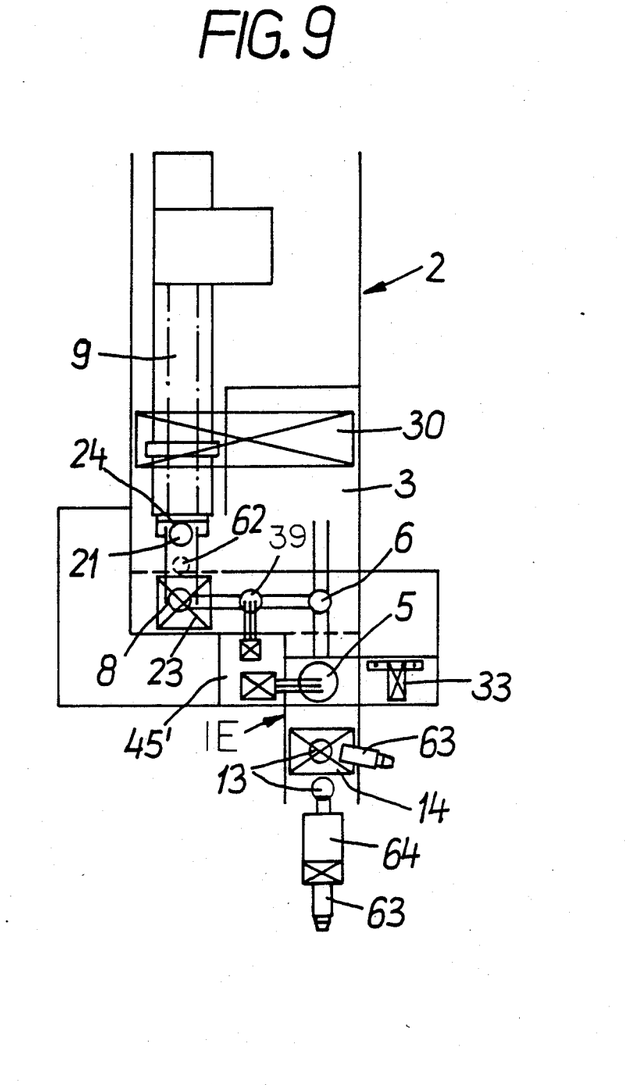
FIG. 9 is a plan view of still another embodiment, which includes an angled furnace hall.

In the system according to FIG. 9, furnace hall 1E is angled in the region of ladle preheating station 6 in order to attain a system of less width than in the embodiment of FIG. 1. Instead of rails 25 (see FIG. 1) for movement of ladles 21 from reserve station 8 into the casting position 24, a ladle turning tower 62 is employed. The scrap is transported by trucks 63 either directly into the available scrap baskets 12 or, if necessary, into the charging funnel of a preceding comminuting device 64 to pulverize the scrap. Material flow and ladle transport are not changed by this variation.

The present disclosure relates to the subject matter disclosed in Federal Republic of Germany patent application Ser. No. P 37 36 117.1 of Oct. 26th, 1987, the entire disclosure of which is incorporated herein by reference.

It will be understood that the above description of the present invention is susceptible to various modifications, changes and adaptations, and the same are intended to be comprehended within the meaning and range of equivalents of the appended claims.

I claim:

1. A system for producing steel, comprising:
   means for processing material having iron therein to provide molten steel, the means for processing including a plurality of treatment stations, one of the treatment stations being a furnace to melt the material;
   a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle;

a casting hall following the furnace hall and having a prepartion hall section where the ladle is prepared for further use, the preparation hall section being adjacent the furnace hall; and means in the casting hall for continuously casting the molten steel carried by the ladle, wherein the furnace hall has a side and has an entrance end where the material having iron therein enters, wherein the casting hall has an end which is adjacent the side of the furnace hall, and wherein the distance between the entrance end of the furnace hall and the end of the casting hall which is adjacent the side of the furnace hall is greater than the distance between the entrance end of the furnace hall and the furnace.

2. The system of claim 1, wherein the transporting means moves the material through the furnace hall along a path which lies in a vertical plane.

3. The system of claim 1, wherein one of the treatment stations is a ladle reserve station where molten steel carried by the ladle awaits transfer to the means for continuously casting, the treatment stations, at least from the furnace to the ladle reserve station, being arranged in a vertical plane.

4. The system of claim 1, wherein the furnace hall is elongated, and further comprising an additional furnace hall which is elongated, and a plurality of additional treatment stations, the furnace hall and additional furnace hall being parallel to one another and the additional treatment stations being arranged in the additional furnace hall in a mirror image of the arrangement of the treatment stations in the furnace hall, at least a portion of the casting hall being located between the furnace hall and the additional furnace hall.

5. The system of claim 1, further comprising servicing stations disposed adjacent the furnace hall and adjacent the casting hall.

6. The system of claim 1, further comprising a housing around the furnace, and means for discharging gas from the housing.

7. The system of claim 1, wherein the furnace is a bottom-discharge electric furnace.

8. The system of claim 1, wherein the furnace comprises a first heating means and a different second heating means.

9. The system of claim 1, wherein the transporting means comprises a trolley which is movable only along the center of the hall.

10. A system for producing steel, comprising:
means for processing material having iron therein to provide molten steel, the means for processing including a plurality of treatment stations, one of the treatment stations being a furnace to melt the material;

a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle;

a casting hall following the furnace hall and having a preparation hall section where the ladle is prepared for further use, the preparation hall section being adjacent the furnace hall;

means in the casting hall for continuously casting the molten steel carried by the ladle;

servicing stations disposed adjacent the furnace hall and adjacent the casting hall; and a trolley movable perpendicular to the casting hall, the trolley connecting one of the servicing stations and one of the treatment stations.

11. The system of claim 10, wherein the transporting means comprises a track extending through the center of the furnace hall, a car movable along the track to carry the ladle, and at least one additional ladle which can be carried by the car.

12. A system for producing steel, comprising:
means for processing material having iron therein to provide molten steel, the means for processing including a plurality of treatment stations, one of the treatment stations being a furnace to melt the material;

a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle;

a casting hall following the furnace hall and having a preparation hall section where the ladle is prepared for further use, the preparation hall section being adjacent the furnace hall; and means in the casting hall for continuously casting the molten steel carried by the ladle, wherein the transporting means includes a track extending through the center of the furnace hall, a car movable along the track to carry the ladle, at least one additional ladle which can be carried by the car, and an additional track disposed above the track.

13. A system for producing steel, comprising:
means for processing material having iron therein to provide molten steel, the means for processing including a plurality of treatment stations, one of the treatment stations being a furnace to melt the material;

a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle, a track extending through the center of the furnace hall, a car movable along the track to carry the ladle, and at least one additional ladle which can be carried by the car;

a casting hall following the furnace hall and having a preparation hall section where the ladle is prepared for further use, the preparation hall section being adjacent the furnace hall;

means in the casting hall for continuously casting the molten steel carried by the ladle; and another track, the another track having a portion which is disposed in the preparation hall section and having a portion which is disposed in the furnace hall and which intersects with the track.

14. The system of claim 13, wherein one of the treatment stations is a ladle preheating station disposed at the intersection of the track and the another track, and wherein the transporting means further comprises a car turntable at the intersection of the track and the another track.

15. A system for producing steel, comprising:

means for processing material having iron therein to provide molten steel, the means for processing including a plurality of treatment stations, one of the treatment stations being a furnace to melt the material;

a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle;

a casting hall following the furnace hall and having a preparation hall section where the ladle is prepared for further use, the preparation hall section being adjacent the furnace hall; and means in the casting hall for continuously casting the molten steel carried by the ladle, wherein one of the treatment stations is a heat treatment station which is spaced apart from the furnace, the heat treatment station including a first heating means and a different second heating means.

16. A system for producing steel, comprising:

means for processing material having iron therein to provide molten steel, the means for processing including a plurality of treatment stations, one of the treatment stations being a furnace to melt the material, the furnace including electrodes;

a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle;

a casting hall following the furnace hall and having a preparation hall section where the ladle is prepared for further use, the preparation hall section being adjacent the furnace hall;

means in the casting hall for continuously casting the molten steel carried by the ladle; and means for changing the electrodes, the means for changing the electrodes including a trolley which moves perpendicular to the furnace hall.

17. A system for producing steel, comprising:

means for processing material having iron therein to provide molten steel, the means for processing including a plurality of treatment stations, one of the treatment stations being a furnace to melt the material and another of the treatment stations being a ladle heating station which includes electrodes;

a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle;

a casting hall following the furnace hall and having a preparation hall section where the ladle is prepared for further use, the preparation hall section being adjacent the furnace hall;

means in the casting hall for continuously casting the molten steel carried by the ladle; and means for changing the electrodes, the means for changing the electrodes including a trolley which moves perpendicular to the furnace hall.

18. A system for producing steel, comprising:

means for processing material having iron therein to provide molten steel, the means for processing including a plurality of treatment stations, one of the treatment stations being a furnace to melt the material, the furnace including a vessel, and another of the treatment stations being a preheating station which receives the material having iron therein;

a furnace hall in which the treatment stations are located, each treatment station being disposed so that a straight line passing through the respective treatment station also passes through an adjacent treatment station, the furnace hall having a cross section which is essentially adapted to the treatment stations so that the treatment stations are compactly accommodated in the furnace hall;

transporting means in the furnace hall for moving the material, the transporting means including a ladle;

a casting hall following the furnace hall and having a preparation hall section where the ladle is prepared for further use, the preparation hall section being adjacent the furnace hall;

means in the casting hall for continuously casting the molten steel carried by the ladle; and means for moving the furnace vessel beneath the preheating station.

19. The system of claim 18, wherein the system is a mini-steel plant and wherein the material having iron therein is scrap.

* * * * *